June 30, 1931.  P. DE MATTIA  1,812,821
VULCANIZING MOLD FOR INNER TUBES AND THE LIKE
Filed Aug. 29, 1928  4 Sheets-Sheet 1
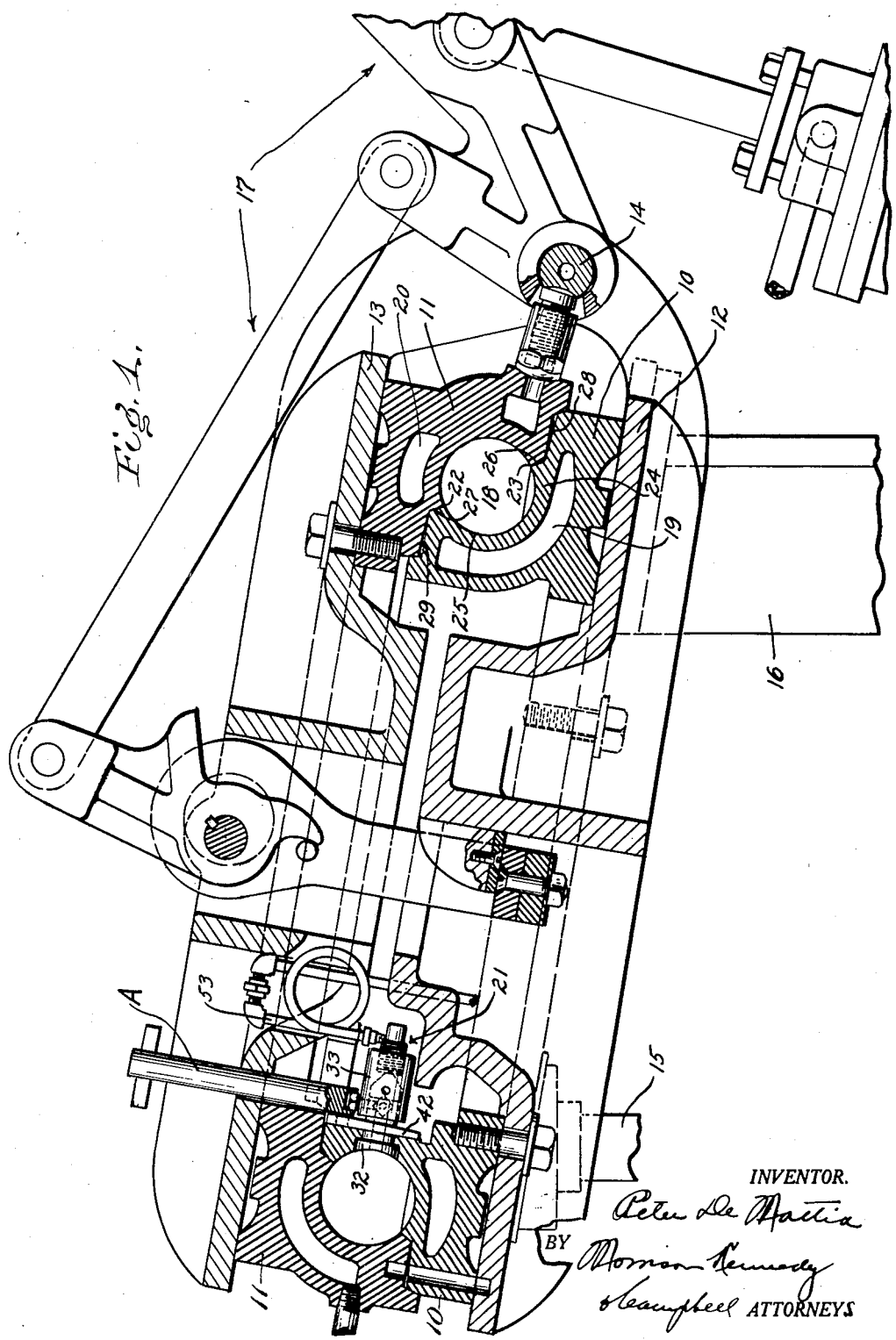
INVENTOR.
Peter De Mattia
BY
ATTORNEYS June 30, 1931. P. DE MATTIA 1,812,821
VULCANIZING MOLD FOR INNER TUBES AND THE LIKE
Filed Aug. 29, 1928 4 Sheets-Sheet 2
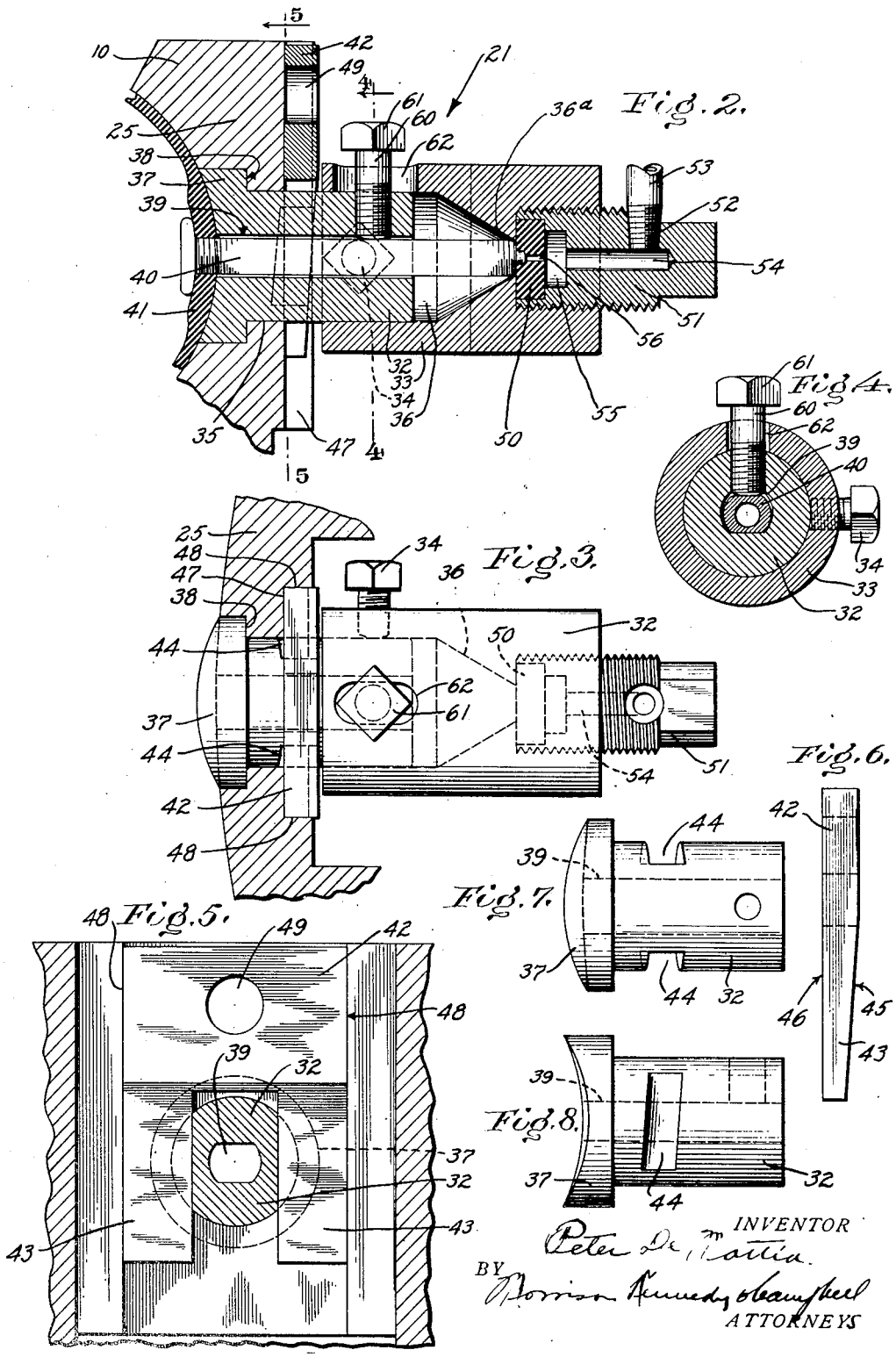

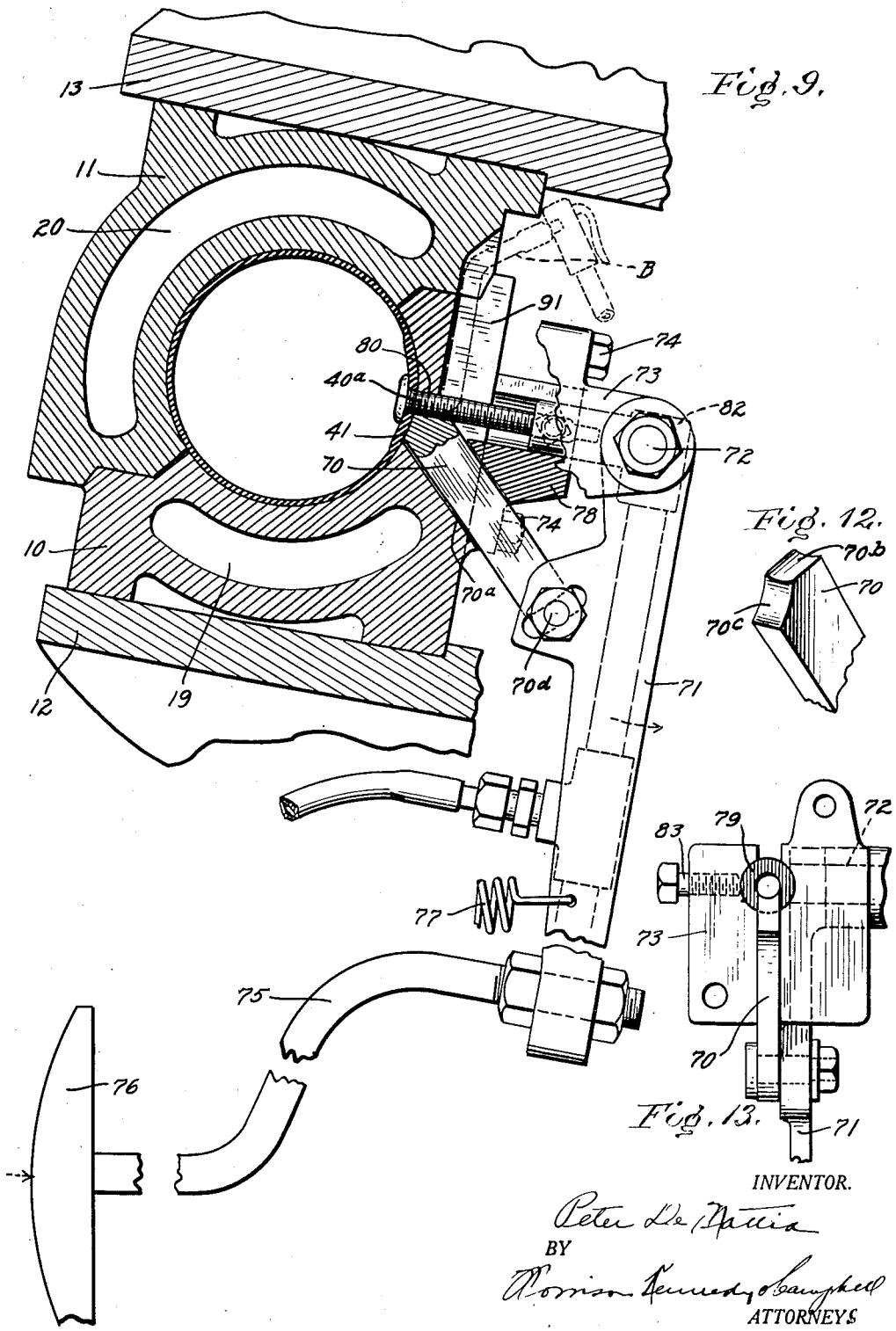

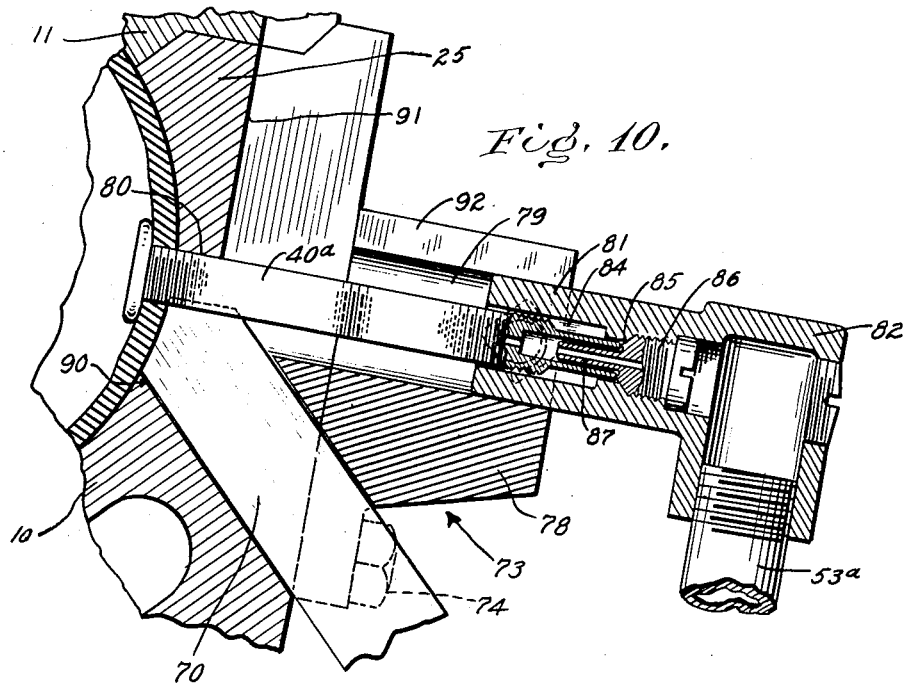
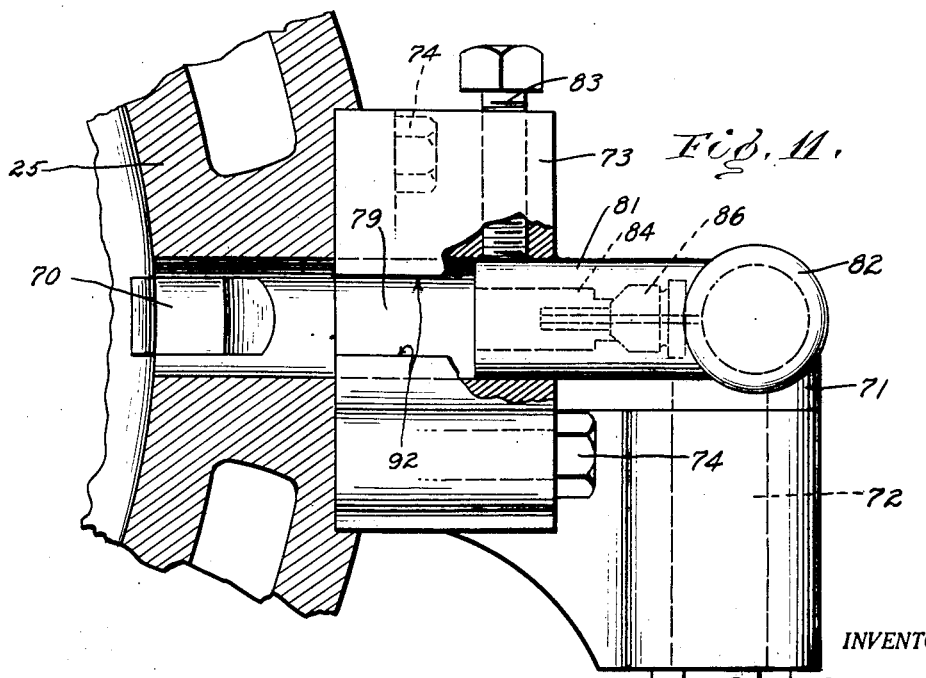

Patented June 30, 1931

1,812,821

UNITED STATES PATENT OFFICE

PETER DE MATTIA, OF PASSAIC, NEW JERSEY, ASSIGNOR TO NATIONAL RUBBER MACHINERY COMPANY, A CORPORATION OF OHIO

VULCANIZING MOLD FOR INNER TUBES AND THE LIKE

Application filed August 29, 1928. Serial No. 302,710.

This invention relates to improvements in vulcanizing apparatus, and refers particularly to means for supplying air or other inflating pressure fluid to inflatable articles, such as inner tubes and the like, while they are being vulcanized in molds or presses.

In one method of producing inner tubes, vulcanization is carried out in steam jacketed molds while the tubes are inflated with air or other fluid under pressure. The tubes are provided with valve stems through which they are inflated and deflated, and in connecting these valve stems with the fluid supply conduits, screw-threaded couplings or unions are ordinarily employed. These old types of connections have given rise to objections in that they require considerable time in being made and broken, and moreover they frequently result in the uneven curing of the tubes as well as in the slowing up of production. Recent advances in the art have reduced the time necessary for vulcanizing inner tubes, and it has become more imperative than ever that the vulcanizers be capable of quick loading and unloading to avoid the foregoing and other objections.

With this object in view, the present invention provides an air pipe coupling in which a fluid-tight joint will automatically be established between the valve stem and the coupling as the unvulcanized tube is positioned in the mold cavity. More specifically, the invention contemplates a coupling which is mounted in fixed relation to the mold and which has a socket for receiving the end of the valve stem as the latter is shoved through the customary hole or aperture formed in the inner wall of the mold cavity. At the bottom of this socket, there is a fluid-conducting member which is engaged by the abutting end of the valve stem, forming a fluid-tight joint, and in one form of the invention the valve stem is locked in position by a set screw carried by the coupling, while in another form the valve stem is locked in place by a clamping member mounted on the fixed mold section. Preferably, the coupling includes telescopic members which are relatively adjustable to compensate for variations in length of different valve stems.

Another feature of the invention is the provision of air pipe connecting means adapted particularly for use in or with a sectional vulcanizing mold whose parting lines are offset from the central circumferential plane of the mold, so as to leave intact the inner or base wall which contains the receiving aperture for the valve stem. To this end, there is inserted in said aperture a bushing, whose inner end is substantially flush with the mold cavity, and whose outer end is provided with means to clamp an inserted valve stem centrally within the longitudinal bore of the bushing. When thus in place, the end of the valve stem extends beyond the bushing and abuts against a packing washer located in a fixed coupling member connected with the air supply pipe. By virtue of the fact that the valve stem is accurately positioned and firmly held within the bushing, it will be cured in its proper place in the rubber tube.

Another feature of the invention resides in the provision of novel means for detachably securing the valve receiving bushing in the mold wall. For this purpose, a bifurcated wedge is slidable in a suitable guide or slot in the outer side of the mold section, and said wedge is adapted to straddle the bushing and engage transverse slots in the opposite sides thereof, holding the bushing against both longitudinal and rotary movement.

The foregoing and other objects, features, and advantages of the invention will be fully appreciated from the following description in connection with the accompanying drawings, wherein two embodiments of the invention have been shown by way of illustration, and wherein Fig. 1 is a vertical longitudinal sectional view through a vulcanizing press equipped with an air pipe connection made in accordance with the invention;

Fig. 2 is a similar sectional view on a larger scale, through the novel coupling for a straight valve stem;

Fig. 3 is a top plan view of the coupling of Fig. 1, with portions of the mold and press shown in section;

Fig. 4 is a vertical transverse sectional view on line 4—4 of Fig. 2;

Fig. 5 is a transverse sectional view on line 5—5 of Fig. 2;

Fig. 6 is an edge view of the wedge used for holding the valve-receiving bushing;

Fig. 7 is a top plan view of the bushing per se;

Fig. 8 is a side elevation thereof;

Fig. 9 is a fragmentary vertical sectional view through a vulcanizing press equipped with a modified form of the invention;

Fig. 10 is a longitudinal sectional view through the modification shown in Fig. 9;

Fig. 11 is a top plan view thereof with parts broken away and parts in section;

Fig. 12 is a detail perspective view of the valve stem clamping member; and

Fig. 13 is an inner end view of the coupling and clamping means disconnected from the mold.

Although the invention is adapted for use in other types of apparatus, it has herein been illustrated specifically as applied to a tube vulcanizing press wherein a pair of opposed mold sections 10 and 11 are respectively attached to platens 12 and 13, hingedly connected together at 14, the lower platen 12 being supported in fixed position by means of suitable standards 15 and 16, and the upper platen 13 being movable toward and from the fixed platen by means of a suitable power mechanism 17, all as more fully described in copending application Serial No. 271,695, filed April 21 1928. The meeting faces of the mold sections 10 and 11 are provided with grooves which, when the press is closed, define a continuous annular mold cavity 18 within which an inner tube or the like is adapted to be confined for vulcanization. Heat is supplied by the circulation of steam or other heating medium through jackets or chambers 19 and 20 which surround the cavity 18 in the usual manner, and pressure is applied to the confined rubber tube by inflating it through the novel connecting means later to be described.

As clearly shown in Fig. 1, the mold cavity 18 is equally divided between the two mold sections 10 and 11, the parting lines of which, at the inner and outer peripheries, intersect the mold cavity of diametrically opposite points 22 and 23, respectively, located on opposite sides of, and of course at equal distances from, the central circumferential plane of the mold. In other words, said parting lines intersect the cavity 18 circumferentially in such a manner as to define a truncated cone whose sides pass diagonally through the center of the mold cavity and whose apex is located in the direction of the opening movement of the movable section 11 as it is carried upwardly by the platen 13. With this arrangement, it will be observed that the lower mold section 10 presents a side wall 24 to engage the green or unvulcanized tube throughout the major portion of its radial extent, and an overhanging inner wall 25 to engage the tube throughout its base or the major portion of its axial extent. The meeting faces of the two mold sections extend obliquely from the points 22 and 23 as indicated at 26 and 27 (Fig. 1), and thence are offset in planes 28 and 29, located at opposite sides of, but parallel to the central circumferential plane. The beveled or inclined portions 26 and 27 form a tapered bore fit serving to accurately register the mold sections when in closed relation, and thus provide a fluid-tight joint to prevent the formation of rinds or fins on the vulcanized tube, the flat or parallel portions at 28 and 29 being slightly spaced apart to provide the necessary clearance. This specific type of mold forms the subject of copending application Serial No. 263,623, filed March 22, 1928 to which reference may be had for further particulars.

Coming now to the present invention and referring particularly to Figs. 2 to 8 inclusive, it will be seen that the novel connecting means 21 is associated with the lower or fixed mold section 10 and is in the nature of a telescopic coupling, comprising a bushing 32 and a sleeve 33, adjustably secured together by a set screw 34. The bushing 32 has a cylindrical body portion which extends through an aperture 35 in the mold wall 25, and projects beyond the wall 25 to enter a socket 36 in one end of the sleeve 33. The inner end of the bushing 32 is provided with an enlarged head 37 which seats snugly in a counterbore 38 in the mold wall 25, and the surface of the inner end of the head portion 37 is made substantially toroidal, so as to be continuous with the surface of the mold cavity 18. The central longitudinal bore 39 of the bushing 32 is intended to receive and accommodate the valve stem 40 of an inner tube 41 when placed in the mold cavity 18 for vulcanization.

The bushing 32 is locked in place in the mold wall 25 by means of a key 42, as clearly shown in Figs. 2, 3 and 5. This key is substantially rectangular in outline, and is bifurcated at its lower end to straddle the bushing 32, presenting side portions 43 which engage in transverse grooves 44 formed in the opposite sides of the bushing. These grooves 44 are slightly inclined, as shown in Fig. 8, and the outer surfaces 45 of key portions 43 are similarly inclined, so that when the key is depressed it will exert a wedging action and draw the head 37 of the bushing into the counterbore 38. The inner surface 46 of the key 42 is flat and bears against the perpendicular face of a recess 47 in the mold wall 25, the side edges 48 of the recess serving to guide the key in its movements transverse to the axis of the bushing, and also preventing rotation of the bushing. If desired, a finger hole 49 may be provided to facilitate insertion and removal of the key 42.

As best shown in Fig. 2 the inner end of the recess 36 in the sleeve 33 is preferably tapered down to an opening 36$^a$ substantially of the same diameter as that of the valve stem 40, and said opening is closed by a rubber packing washer 50, against which the end of the inserted valve stem is adapted to abut, making a fluid-tight joint. This packing washer 50 is clamped in position within the sleeve 33 by a nipple 51 which is screwed into the outer end of the sleeve and is connected at 52 to an air supply pipe 53 communicating with any suitable source of compressed air or other inflating fluid. The nipple 51 has a central port 54 which receives the air or other fluid from the supply pipe 53, and adjacent the inner end of the nipple, the port 54 opens into a counterbore 55 of larger diameter than the aperture 56 in the packing washer 50. Thus it will be seen that when the device is in use, the pneumatic pressure within the counterbore 55 will assist in maintaining the washer 50 and the end of the valve stem 40 in sealing relation, and will prevent leakage of fluid into the recess 36. As shown in Fig. 2, the reduced or screwcap end of the valve stem 40 is adapted to embed itself into the rubber washer 50 or to project into the aperture 56, the adjacent shouldered portion of the stem contacting with the exposed face of the washer, so that a fluid-tight connection between the washer and valve stem is assured.

For the purpose of firmly holding the valve stem 40 during the vulcanizing operation, the bushing 32 is provided with a set screw 60 which extends upwardly, having its inner or lower end adapted to clamp the valve stem within the aperture 39, while its outer or upper end has a head 61 to facilitate turning. If desired, a socket wrench A (Fig. 1) may be employed for turning the set screw when the mold is closed. The shank of the set screw 60 passes through a slot 62 in the sleeve 33, this slot being of such proportions as to permit relative axial adjustment of the sleeve on the bushing without interference from the set screw 60. The telescopic adjustment of the coupling compensates for variations in the lengths of the valve stems, as well as for different locations of the mold wall 25 with reference to the air supply pipe 53. In this connection it may be noted that in the vulcanizing press illustrated, it is contemplated to interchange mold sections of different sizes in the platens 12 and 13, and for this reason the relationship between the mold wall 25 and the air supply pipe may vary.

While it is desirable to lock the valve stem in position, as by means of the set screw 60, this is not absolutely necessary, as the air pressure within the inner tube in acting on the enlarged base of the valve stem will serve to hold it in fluid-tight engagement with the packing washer 50. However, if the valve stem is left free, the air pressure within the tube may at times cause the base of the stem to embed itself too far into the inner wall of the tube or to crowd the rubber away from the body of the stem. By the use of the set screw 60, these conditions may be easily regulated, since by loosening the screw after vulcanization starts the valve stem may be caused to embed itself into the rubber tube to any extent desired and then locked in place or by tightening up the screw before vulcanization starts it may be prevented from embedding itself into the tube at all. Ordinarily the position of the valve stem will be as indicated in Fig. 7.

In installing the coupling 21 in the mold or press, the bushing 32 is first inserted in the aperture 35 in the mold wall 25 with the grooves 44 disposed at the sides, as shown. The key 42 is then positioned in the guiding recess 47 and forced downwardly with its wedging portions 43 engaging in the grooves 44. Thus the bushing 32 is locked against both axial and rotary movement, and in this condition the sleeve 33 can be applied to it. Initially, the bushing and sleeve are adjusted to properly accommodate valve stems 40 of a certain size, and when they are so adjusted they are locked together by the set screw 34.

When the device is in use, an unvulcanized tube 41 is placed in the mold cavity 18 while the press is opened, the valve stem 40 being presented longitudinally to and through the central bore 39 of the bushing from within the cavity 18. The valve stem is pressed against the packing washer 50 sufficiently to seal the communication between the interior of the tube 41 and the nipple 51, and thereupon the valve stem may be locked in place by means of the set screw 60, either before or after the mold is closed. When the press is closed and locked, the tube 41 is inflated and expanded to press it against the heated walls of the mold cavity 18. After being subjected to vulcanizing heat and pressure for a sufficient length of time, the mold is opened and the vulcanized tube removed and replaced by another unvulcanized tube, whereupon the operations are repeated. It is pointed out that the fluid-tight connection of the valve stem with the air supply pipe is made automatically as the tube is positioned in the mold, due to the fact that the washer 50 is so located as to make contact with the end of the valve stem as the latter is shoved through the bushing 32, and hence considerable time is saved in the loading operations and more time is saved in the unloading operations because the valve stem can be so easily disconnected.

In Figs. 9 to 13 inclusive, a modified form of the invention is shown, wherein the valve stem 40ª is clamped in the mold wall by a locking bar 70 which is slidable in an opening 70ª extending diagonally through the mold wall and intersecting the valve stem opening 80. The inner end of the bar (see Fig. 12) is formed with a curved surface 70ᵇ adapted to engage the lower side of the valve stem, and another curved surface 70ᶜ which is flush with the surface of the mold cavity when the bar is in its locking position. The outer end of the bar 70 is pivotally connected at 70ᵈ to a lever 71, which, in turn, is pivoted at 72 to a bracket 73 secured to the inner side of the mold section 10 as by bolts 74. The lever 71 preferably extends downwardly from the bracket 73 and is provided, at its lower end, with a forwardly extending push rod 75 having a pad 76 on its extremity whereby it may be rocked to unlocking position by manual pressure. A tension spring 77 acts upon the lever 71 to normally maintain the bar 70 in its locking position, and thus the valve stems will be firmly held during the vulcanizing operations.

The bracket 73 is also provided with a boss 78 having a longitudinal bore 79 in axial alinement with the valve stem opening 80 in the mold wall 25, and this bore 79 is of sufficient diameter to snugly receive one end 81 of an L-shaped fitting or gun 82, the other end of which is secured to the air supply pipe 53ª. The gun 82 is adjustable toward and from the mold wall and is clamped in its adjusted position by a set screw 83, such adjustment being provided in order to accommodate valve stems of different lengths. The outer end 81 of the air gun is counterbored to provide a socket 84 for the reception of the end of the valve stem 40ª, the reduced extremity of which, as best shown in Fig. 10, is adapted to abut against a knife-edged annular shoulder 85 on a nipple 86 screwed into the bottom of the socket 84. The nipple 86 also has a reduced extremity 87 which is adapted to extend into the end of the valve stem to guide it to its seat against the shoulder 85 and to direct the inflating air into it.

In using this form of the invention, the gun 82 is first adjusted to its proper position to accommodate valve stems of a certain length, and it is locked in such position by the screw 83. Then while the mold is open, the attendant places an unvulcanized tire in the cavity of the fixed mold section, pushing the valve stem 40ª through the opening 80 and to its seat against the knife-edged shoulder 85 of the nipple 86. Pressure, which has in the meantime been applied to the pad 76 to retract the bar 70, is then released, whereupon the spring 77 draws the lever 71 forwardly to effect the clamping of the valve stem by engagement with the upper end of the bar 70. So far as its clamping action is concerned, the bar 70 corresponds in function to the screw 60 of the first described embodiment and may be manipulated before and after the closing of the press in like manner and for the same reasons. The closing of the press, inflation of the tube, and subsequent opening of the press may then be carried out either manually or automatically as desired. Thus, the operations of loading and unloading the vulcanizing unit can be very quickly performed because the connections between the valve stem and air supply are automatically made and broken as the tubes are successively inserted and removed. The invention is extremely simple in construction, capable of being economically produced, and constitutes a substantial advance in the art.

The use of the clamping bar 70 in the second embodiment above described also permits the vulcanization of inner tubes with bent or crooked valve stems, such as indicated by the dotted lines B in Fig. 9. In other words, when the bar 70 is withdrawn in the manner described, it leaves an opening 90 through the mold wall 25 which communicates with a vertical opening or slot 91 also cut through the mold wall, these two openings in conjunction with the slot 92 formed in the upper side of the bracket 73 permitting the insertion of the bent valve stem, and the bar 70, when released, acting to clamp said valve stem in place. In this instance, the old type of air connection is shown (see Fig. 9) for cooperation with the bent valve stem.

Obviously the invention is susceptible of numerous modifications in the details of construction and arrangement of parts, and the right is herein reserved to make such changes as fall within the scope of the appended claims without departing from the spirit of the invention.

Having thus described my invention, what I claim is:

1. In or for a mold for vulcanizing inflatable articles having tubular valve stems, a quick-detachable pressure fluid pipe connection comprising a boss on the outer mold wall and an aperture extending therethrough to the inner wall of the mold adapted to receive a valve stem, said boss being shorter than the valve stem, a sleeve secured to said boss having a socket adapted to receive and form a fluid tight connection with the outer end of the valve stem, said socket having an aperture through which the pressure fluid is supplied to the valve stem, and means for locking the valve stem relative to the mold.

2. In or for a mold for vulcanizing inflatable articles having tubular valve stems, a quick-detachable pressure fluid pipe connection comprising a boss on the outer mold wall and an aperture extending therethrough to the inner mold wall adapted to receive a valve stem, said boss being shorter than the valve stem, and a sleeve having a socket adapted to receive and form a fluid tight connection with the outer end of the valve stem secured to said boss adjustably so as to be suitable to receive valve stems of different length, said socket having an aperture through which the pressure fluid is supplied to the valve stem, and means for locking the valve stem relative to the mold.

3. In combination, a vulcanizing mold having a mold cavity, a protuberance on the outer mold wall, an aperture extending through the protuberance to the inner mold wall adapted to receive a valve stem, said protuberance being provided with a pressure fluid coupling positioned to engage and form a fluid-tight connection with the end of a valve stem inserted through the aperture, and means for locking the valve stem in said aperture.

4. In combination, a vulcanizing mold having a mold cavity, a protuberance on the outer mold wall, an aperture extending through the protuberance to the inner mold wall adapted to receive a valve stem, said protuberance being provided with a fluid pressure coupling adjustably mounted to engage and form a fluid-tight connection with the end of valve stems of different length inserted through the aperture, and means for locking a valve stem in said aperture.

5. In or for a mold for vulcanizing inflatable articles having tubular valve stems, a quick-detachable pressure fluid pipe connection comprising a bushing extending through the wall of the mold and provided with a central bore for receiving the valve stem, said bushing being shorter than the valve stem, a sleeve secured to said bushing and having a socket for the outer end of said valve stem, and a packing member located at the bottom of said socket for abutment with the end of the valve stem, said packing member having an aperture through which the pressure fluid is supplied to the valve stem.

6. In or for a vulcanizing mold, a two-part telescopic coupling having one of its parts extending through the mold wall and apertured to receive a longitudinally inserted valve stem, and having its other part fixed with reference to the first-mentioned part and secured to a pressure fluid supply pipe, said other part having a tapered socket into which the valve stem extends, and a sealing washer disposed at the bottom of said socket for abutment with the end of the valve stem whereby to seal the connection between the valve stem and the pressure fluid supply pipe.

7. In or for a vulcanizing mold, a quick-detachable pressure fluid pipe connection comprising a bushing extending through the wall of the mold and provided with a central bore for receiving the valve stem of an inflatable article in the mold, said bushing being shorter than the valve stem and having means for clamping the valve stem in place, a coupling member encircling the outer end of the bushing and having a recess for endwise insertion of the valve stem, a discharge nipple associated with said coupling member at the bottom of said recess, and a packing washer held at the inner end of said nipple for abutment with the end of the valve stem whereby to provide sealed communication between the valve stem and the nipple.

8. In combination with a vulcanizing mold having a mold cavity, a bushing extending through the wall of the mold and having its inner end substantially flush with the mold cavity, said bushing having a central longitudinal bore for receiving an inserted inflation valve stem, and a wedge member to detachably retain the bushing in the mold and to hold the same against rotary and longitudinal movement.

9. In combination with a vulcanizing mold having a mold cavity, a bushing extending through the wall of the mold and having its inner end substantially flush with the mold cavity, said bushing having a central longitudinal bore for receiving an inserted inflation valve stem, and having transverse grooves in its opposite sides, and a bifurcated wedge straddling the bushing and engaging in said grooves to hold the bushing in place.

10. In combination with a vulcanizing mold having a mold cavity and an aperture through its wall, the inner end of the aperture being counterbored, a bushing extending through the aperture and provided with a cylindrical head seating in the counterbore, said bushing having a longitudinal bore for receiving an endwise inserted inflation valve stem and having angularly disposed transverse grooves in its opposite sides, and a bifurcated wedge member straddling the bushing and engaging in said grooves to hold the bushing against longitudinal displacement, said wedge member being non-rotatably held by a portion of the mold.

11. In combination with a vulcanizing mold having a mold cavity, a bushing extending through the wall of the mold and having its inner end substantially flush with the mold cavity, said bushing having a central longitudinal bore for receiving an endwise inserted inflation valve stem, means for detachably holding the bushing against longitudinal movement and against rotation, means for clamping an inflation valve stem in the bore of the bushing with its end extending beyond the bushing, and a coupling member mounted in fixed position with reference to the mold and the bushing, said coupling member having connection with a pressure fluid supply pipe and having a packing washer against which the end of the inserted valve stem is adapted to abut to provide a quick-detachable fluid-tight joint between the valve stem and the air pipe.

In testimony whereof, this specification has been duly signed by:

PETER DE MATTIA.